(12) United States Patent
Tajima et al.

(10) Patent No.: US 8,950,739 B2
(45) Date of Patent: Feb. 10, 2015

(54) SPRING

(75) Inventors: Norihiro Tajima, Yokohama (JP); Jun Tominaga, Yokohama (JP); Hidemasa Ito, Yokohama (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 161 days.

(21) Appl. No.: 12/991,526

(22) PCT Filed: May 8, 2009

(86) PCT No.: PCT/JP2009/058683
§ 371 (c)(1),
(2), (4) Date: Nov. 8, 2010

(87) PCT Pub. No.: WO2009/139332
PCT Pub. Date: Nov. 19, 2009

(65) Prior Publication Data
US 2011/0057368 A1    Mar. 10, 2011

(30) Foreign Application Priority Data

May 13, 2008    (JP) .................................. 2008-125398

(51) Int. Cl.
*F16F 1/32*    (2006.01)

(52) U.S. Cl.
CPC ..................... *F16F 1/32* (2013.01)
USPC ........................ 267/161; 267/136; 267/160

(58) Field of Classification Search
USPC ......... 267/161, 163, 181, 164, 136, 6, 7, 158, 267/141.1, 160; 188/313
IPC ............... F16F 15/04,15/06, 1/32; F16D 13/44, F16D 1/32
See application file for complete search history.

(56) References Cited

U.S. PATENT DOCUMENTS 3,261,598 A    7/1966    Jones
3,563,527 A *  2/1971    Tillman .................. 267/181

(Continued)

FOREIGN PATENT DOCUMENTS

JP    U-50-58155    5/1975
JP    A-58-632      1/1983

(Continued)

OTHER PUBLICATIONS

International Search Report for International Patent Application No. PCT/JP2009/058683, mailed on Jun. 2, 2009.

(Continued)

*Primary Examiner* — Anna Momper
*Assistant Examiner* — San Aung
(74) *Attorney, Agent, or Firm* — Oliff PLC

(57) ABSTRACT

The first corner portion elastically deforms in application of load such that the angle of the first corner portion changes depending on the pressing force from the first member. In this case, the first corner portion can move toward the outside of the inner periphery portion of the main body portion while the angle changes. The second corner portion has the same function as that of the first corner portion, and it can move toward the outside of the outer periphery portion of the main body portion while the angle changes depending on the pressing force from the second member in the elastic deformation of the second corner portion. As a result, the spring can prevent generation of hysteresis in load characteristics without increasing the number of parts, and enables height adjustment of the spring.

5 Claims, 6 Drawing Sheets

(56) References Cited

U.S. PATENT DOCUMENTS 4,968,010 A * 11/1990 Odobasic ................. 267/162
7,216,859 B2 * 5/2007 Sebert .................... 267/160

FOREIGN PATENT DOCUMENTS

| JP | A-2-8523 | 1/1990 |
| JP | A-5-172171 | 7/1993 |
| JP | U-6-76728 | 10/1994 |
| JP | A-9-21437 | 1/1997 |
| JP | A-2002-54685 | 2/2002 |

OTHER PUBLICATIONS

May 24, 2013 Search Report issued in European Patent Application No. EP 09 74 6539.

* cited by examiner

SPRING

TECHNICAL FIELD

The present invention relates to a spring which is provided between a first member and a second member and inhibits transmission of high-frequency vibration. In particular, it relates to an improvement in a shape of the spring.

BACKGROUND ART

In an automobile industry, a precision equipment industry, or the like, inhibition technique of transmission of vibration is required. It is advantageous that natural frequency of system having an object and a support portion be set sufficiently lower than a predetermined frequency range in inhibition technique of transmission of vibration. In this technique, the spring constant of the support portion may be small. However, in this case, deflection amount of spring may be large, and the spring may be large.

Techniques have been proposed in which a coned disc spring is disposed between the object and the support portion. Load characteristics of the coned disc spring can be designed as shown by a curved line in FIG. 10, so that a region A, at which the coned disc spring can support a load and the spring constant thereof can be set small, can be set.

However, when the coned disc spring deforms so as to be almost flat by application of load, an inner periphery portion and an outer periphery portion of the coned disc spring slides on counter members, so that friction generates therebetween. Due to this, when the use range of the coned disc spring is set within the region A in FIG. 10, in practical load characteristics of the coned disc spring, hysteresis shown in FIG. 11A generates. As a result, a substantial dynamic spring constant becomes a gradient of diagonal line 1 connecting the plot P and the plot Q in FIG. 11A. In this case, when amplitude of the use range is small, the dynamic spring constant is large.

As described above, in the conventional coned disc spring, when minimal amplitude vibration such as high-frequency vibration is input, dynamic spring constant of coned disc spring is large, so that transmission of high-frequency vibration cannot be inhibited. This problem is serious in the coned disc spring which deforms such that surface contact occurs between a counter member and a bending portion, which is provided at the inner peripheral edge portion and the outer peripheral edge portion of the coned disc spring, as disclosed in Japanese Unexamined Patent Application Publication No. H5-172171. In order to prevent generation of hysteresis in load characteristics, a low frictional member may be provided to at least one of spaces between the coned disc spring and the counter member as disclosed in Japanese Unexamined Patent Application Publication No. 2002-54685. However, in this technique in Japanese Unexamined Patent Application Publication No. 2002-54685, since the low frictional member, which is other than the coned disc spring, is provided, the number of parts is increased.

When the coned disc spring is uneven in the height direction, height adjustment is necessary. In order to solve this problem, upper and lower surfaces may be ground so as to perform height adjustment. However, in this case, when upper and lower surfaces may be ground, load characteristics greatly change, and inner and outer diameters change, so that bump occurs in providing the coned disc spring between an object and a support portion of system. In particular, in coned disc springs, inner and outer diameters of coned disc spring are determined as a design value beforehand depending on a system to which coned disc spring is provided. Due to this, in practice, height adjustment cannot be performed.

DISCLOSURE OF THE INVENTION

An object of the present invention is to provide a spring which can prevent generation of hysteresis in load characteristics without increasing the number of parts and which enables height adjustment of the spring.

According to one aspect of the present invention, a spring, which is provided between a first member and a second member, includes: a main body portion having a hole; a projection provided at least one periphery portion of an inner periphery portion and an outer periphery portion of the main body portion; and a corner portion formed at a boundary portion between the main body portion and the projection. The main body portion extends in a direction which crosses a direction of pressing force provided by the first member and the second member. The projection has an abutting portion which projects from the periphery portion of the main body portion to one member of the first member and the second member and abuts thereon. The corner portion is elastically deformable such that an angle of the corner portion changes depending on the pressing force. In this case, the position relationship between the abutting portion of the projection and the first member or the second member is as follows. That is, when the projection is provided at one periphery portion of the inner periphery portion and the outer periphery portion, the projection has an abutting portion which projects from the periphery portion of the main body portion to one member of the first member and the second member and abuts thereon. When the projection is provided at both of the periphery portions which are the inner periphery portion and the outer periphery portion, the projection provided at the inner periphery portion has an abutting portion which projects from the inner periphery portion of the main body portion to one member of the first member and the second member and abuts thereon. The projection provided at the outer periphery portion has an abutting portion which projects from the outer periphery portion of the main body portion to the other member of the first member and the second member and abuts thereon.

In the spring of the aspect of the present invention, the main body portion extends in a direction which crosses a direction of pressing force provided by the first member and the second member, and the projection projects from the periphery portion of the main body portion to one of the first member and the second member (hereinafter referred to as "counter member"), and the projection abuts thereon. In application of load, the corner portion, which is formed between the main body portion and the projection, can elastically deform such that angle of the corner portion changes depending on the pressing force provided by the counter member. In this case, since the corner portion is formed at the boundary portion between the main body portion and the projection which are positioned to each other in the above manner, in the application of load, the corner portion can move toward the outside of the periphery portion, at which the projection is provided, in the extending direction of the main body portion while the angle of the corner portion changes. In this case, the outside of the periphery portion denotes an inner side of the inner periphery portion when the periphery portion at which the projection is provided is the inner periphery portion. The outside of the periphery portion denotes an outer side of the outer periphery portion when the periphery portion at which the projection is provided is the outer periphery portion.

In this manner, the corner portion can elastically deform in application of load. Thus, the length between the corner portion and the projection is appropriately set, so that the deformation of a portion of the projection which is proximate to the counter member can be prevented. Therefore, the slide of the projection on the counter member can be prevented, so that friction does not generate between the projection and the counter member. As a result, hysteresis by friction does not generate in the load characteristics. Since the portion of the projection proximate to the counter member is an undeforming portion, the change in the load characteristics can be prevented even when the height of the spring is adjusted by working such as grinding of the undeforming portion.

According to a preferred embodiment of the present invention, the spring of the present invention can various structures. For example, the projection may be a cylinder portion. In this feature, even when the cylindrical portion is subjected to working such as grinding, inner and outer diameters of the spring do not change since the projection is the cylinder portion. The main body portion may have an inclined shape, a stepped shape, or an approximate S-shape from the inner periphery portion to the outer periphery portion of the main body portion. A stopper for preventing a slide of the abutting portion on the counter member, on which the projection abuts, is provided on the member. In this feature, generation of hysteresis in the load characteristics of the spring can be effectively prevented. A slit may be formed at least one of the main body portion and the projection. In this feature, the weight of the spring can be reduced.

According to the present invention, since the corner portion formed between the main body portion and the projection can elastically deforms in the application of load, the slide of the projection on the counter member can be prevented. Therefore, friction does not generate between the projection and the counter member, so that hysteresis by friction does not generate in the load characteristics. Since the portion of the projection proximate to the counter member does not deform, the change in the load characteristics can be inhibited even when the height of the spring is adjusted by working such as grinding of the undeforming portion.

BRIEF DESCRIPTION OF THE DRAWINGS

FIG. 1A is a perspective view of the spring and, FIG. 1B is a side cross sectional view of right side portion of the spring.

FIG. 2A is a side cross sectional view showing the condition of the spring before action (dotted line) and the condition of the spring in action (solid line). FIG. 2B is an enlarged side cross sectional view of a first corner portion and a second corner portion of the spring in action.

FIG. 11A shows a case in which the amplitude of the use range of the coned disc spring is a predetermined range, and FIG. 11B shows a case in which the amplitude of the use range of the coned disc spring is smaller than that of the case shown in FIG. 11A.

EXPLANATION OF REFERENCE NUMERALS

Figure 1A:
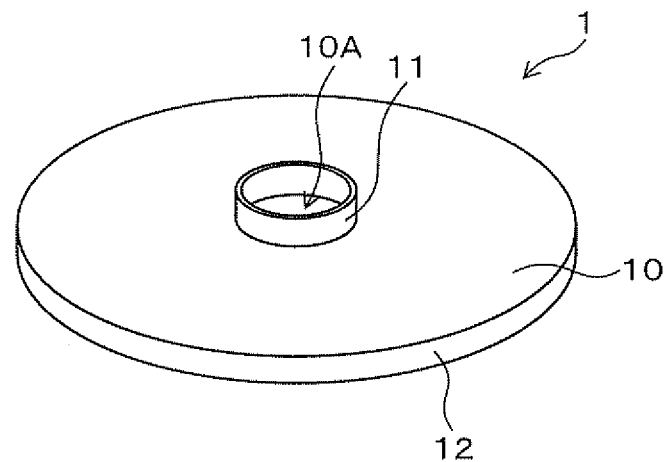
FIGS. 1A and 1B show a structure of a spring of one embodiment according to the present invention.

Reference numerals 1 to 6 denote a spring, 10 denotes a main body portion, 10A denotes a hole, 11 denotes a first cylindrical portion (projection), 12 denotes a second cylindrical portion (projection), 13 denotes a first corner portion (corner portion), 14 denotes a second corner portion (corner portion), 101 denotes a first member, 101A denotes a recess (stopper), 102 denotes a second member, 102A denotes a recess (stopper), and α and β denote an angle.

BEST MODE FOR CARRYING OUT THE INVENTION

1. Construction of Embodiment

Figure 1B:
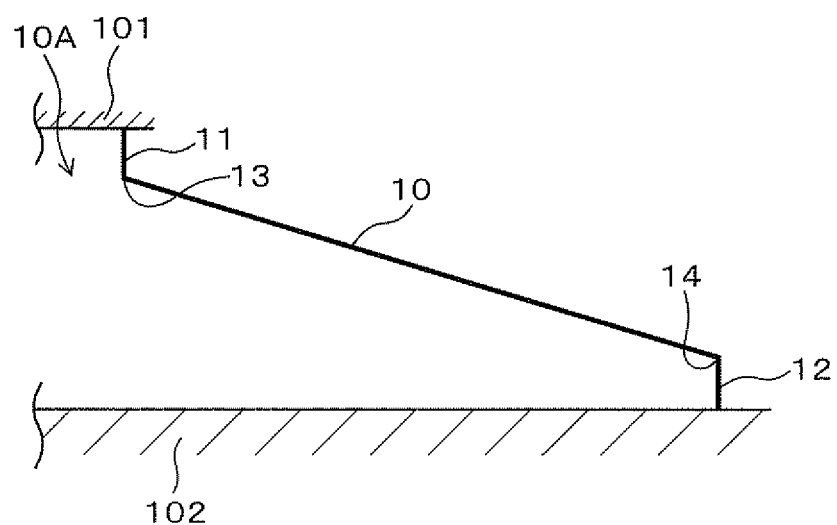

One embodiment of the present invention will be explained hereinafter with reference to drawings. FIGS. 1A and 1B show a structure of a spring 1 of one embodiment according to the present invention. FIG. 1A is a perspective view of the spring 1, and FIG. 1B is a side cross sectional view of right side portion of the spring 1. FIG. 1B shows a condition in which the spring 1 is disposed between members 101 and 102.

For example, the spring 1 is equipped with a main body portion 10, and a hole 10A is formed at the center of the main body portion 10. For example, the main body portion 10 is an approximate conical portion extending in a direction which crosses a direction of pressing force provided by the first member 101 and the second member 102. For example, the conical portion inclines in a lower direction, and has the same function as that of a coned disc spring.

For example, the hole 10A has a circular shape. A first cylindrical portion 11 (projection), which projects toward the first member 101, is provided at an inner periphery portion of the main body portion 10. An upper end portion of the first cylindrical portion 11 is an abutting portion which abuts on the first member 101. A second cylindrical portion 12 (projection), which projects toward the second member 102, is provided at an outer periphery portion of the main body portion 10. A lower end portion of the second cylindrical portion 12 is an abutting portion which abuts on the second member 102.

A first corner portion 13 is formed at a boundary portion between the main body portion 10 and the first cylindrical portion 11. A second corner portion 14 is formed at a boundary portion between the main body portion 10 and the second cylindrical portion 12. The first corner portion 13 and the second corner portion 14 are elastically deformable such that angles of the corner portions 13 and 14 change depending on the pressing force from the first member 101 and the second member 102. The first corner portion 13 and the second corner portion 14 can be formed by various methods. For example, the first corner portion 13 and the second corner portion 14 can be formed such that the boundary portion between the main body portion 10 and the first cylindrical portion 11 is folded and the boundary portion between the main body portion 10 and the second cylindrical portion 12 is folded. For example, the main body portion 10 and the first cylindrical portion 11 are welded, and the main body portion 10 and the second cylindrical portion 12 are welded.

2. Action of the Embodiment

Figure 2A:
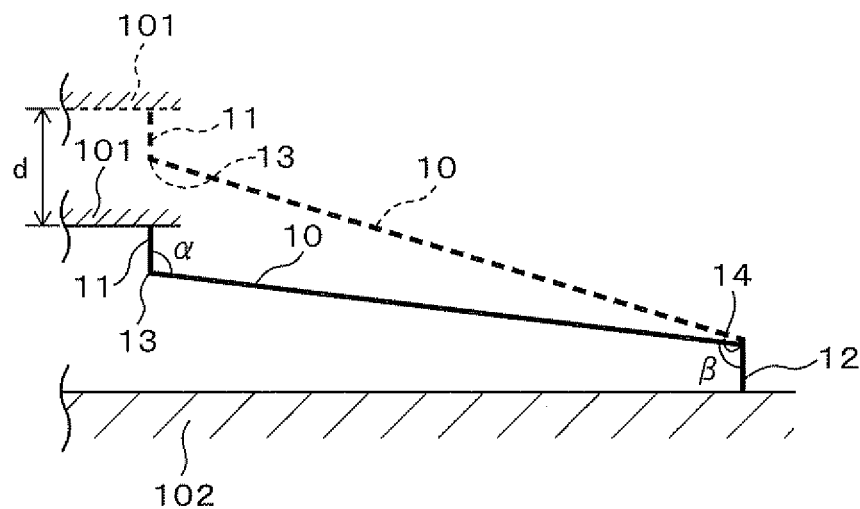
FIGS. 2A and 2B show an action condition of the right side portion of the spring in FIGS. 1A and 1B.
Figure 2B:
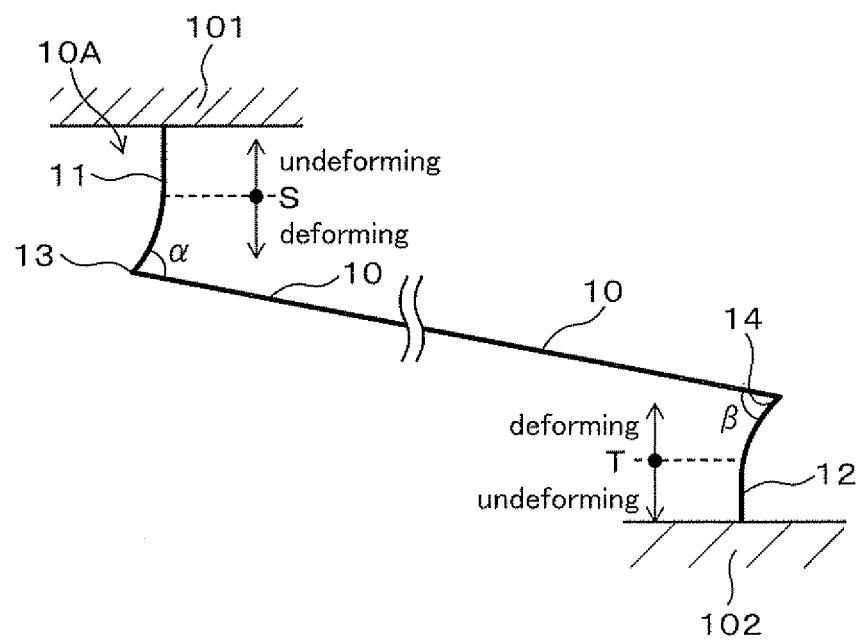
Figure 3:
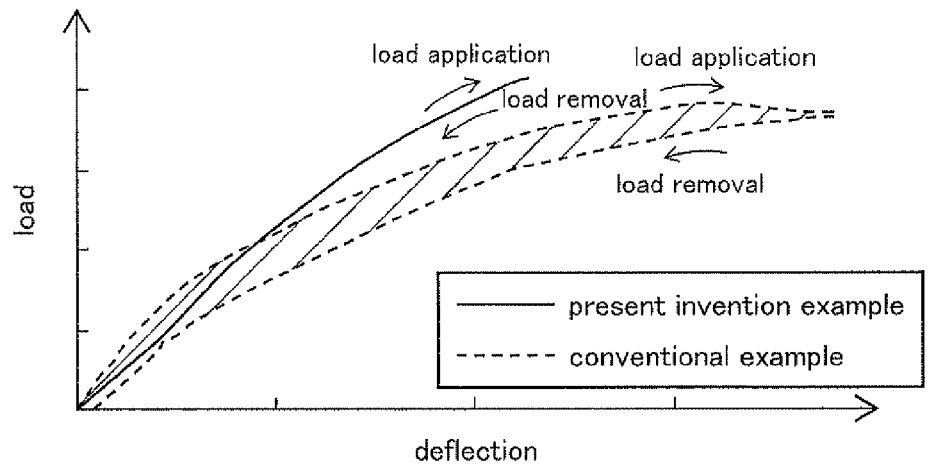
FIG. 3 is a graph showing load characteristics of springs of the present invention example and conventional example.

The action of the spring 1 will be explained hereinafter by mainly referring to FIGS. 2A, 2B, and 3. FIGS. 2A and 2B show an action condition of the spring 1 FIG. 2A is a side cross sectional showing the condition of the spring 1 before the action (dotted line) and the condition of the spring in action (solid line). FIG. 2B is an enlarged side cross sectional view of the first corner portion 13 and the second corner portion 14 of the spring 1 in action. FIGS. 2A and 2B show an action condition of only the right side portion of the spring in the same manner as in FIG. 1B. FIG. 3 is a graph show load characteristics of springs of the present invention example and conventional example.

As shown by the dotted line in FIG. 2A, a load toward the lower side is applied to the spring 1 disposed between the first member 101 and the second member 102. As shown by the solid line in FIG. 2B, the spring 1 deflects, and the first member 101 moves downward. Reference symbol d denotes deflection amount of the spring 1.

In this embodiment, the main body portion 10 extends in a direction which crosses a direction of pressing force provided by the first member 101, and the first cylindrical portion 11 projects from the inner periphery portion of the main body portion 10 to the first member 101, and it abuts on the first member 101. In application of load, the first corner portion 13, which is formed between the main body portion 10 and the first cylindrical portion 11, can elastically deform such that the angle α of the corner portion 13 changes depending on the pressing force from the first member 101. In this case, since the first corner portion 13 is formed at the boundary portion between the main body portion 10 and the first cylindrical portion 11 which are positioned to each other in the above manner, the first corner portion 13 can move toward the outside of the inner periphery portion of the main body portion 10 (the left side in the Figure) while the angle α changes in the application of load.

In this manner, the first corner portion 13 can elastically deform in the application of load. Thus, the first cylindrical portion 11 has appropriate length (height) so as to have an undeforming portion (the portion which is upper than the plot S in FIG. 2B and does not deform) proximate to the first member 101, so that the deformation of the portion of the first cylindrical portion 11 which is proximate to the first member 101 can be prevented.

At the lower side of the spring 1, the second cylindrical portion 12 projects from the outer periphery portion of the main body portion 10 to the second member 102, and it abuts on the second member 102. In application of load, the second corner portion 14 elastically deforms such that the angle β of the second corner portion 14 changes depending on the pressing force from the second member 102. In this case, the second corner portion 14 having the same function as the first corner portion 13 can move toward the outside of the outer periphery portion of the main body portion 10 (the right side in the Figure) while the angle β changes in the application of load.

In this manner, the second corner portion 14 can elastically deform in the application of load. Thus, the second cylindrical portion 12 has appropriate length (height) so as to have an undeforming portion (the portion which is lower than the plot T in FIG. 2B and does not deform) proximate to the second member 102, so that the deformation of the portion of the second cylindrical portion 12 which is proximate to the second member 102 can be prevented.

As a result, the slide of the first cylindrical portion 11 and the second cylindrical portion 12 can be prevented, so that friction does not generate between the first cylindrical portion 11 and the first member 101 and between the second cylindrical portion 12 and the second member 102. As shown in FIG. 3, in the conventional example of the coned disc spring which slides on the counter member, hysteresis by friction generates in the load characteristics. In contrast, in the present invention example of the spring 1 which does not slide on the counter member, hysteresis by friction does not generate in the load characteristics.

Since the portions of the first cylindrical portion 11 and the second cylindrical portion 12 proximate to the counter members are undeforming portions, the change of load characteristics can be inhibited when the height of the spring 1 is adjusted by working such as grinding of the portions. In particular, since the first cylindrical portion 11 and the second cylindrical portion 12 are provided as the projection of the present invention, inner and outer diameters of the spring 1 do not change even when the first cylindrical portion 11 and the second cylindrical portion 12 are subjected to working such as grinding.

3. Modification Example

As described above, the present invention is explained by using the above embodiment. However, the present invention is not limited to the above embodiment, and various modifications can be performed. In the following modification example, the same components as those of the above embodiment use the same reference numerals as those of the above embodiment, and the explanation of the same components are omitted.

Figure 4:
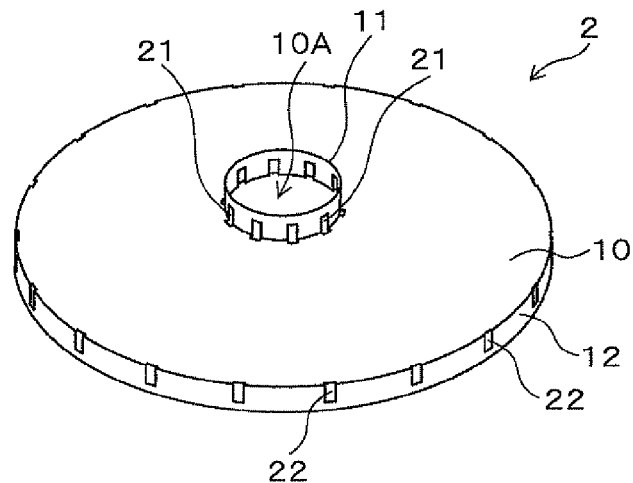
FIG. 4 is a perspective view showing one example of spring of one embodiment according to the present invention.
Figure 5:
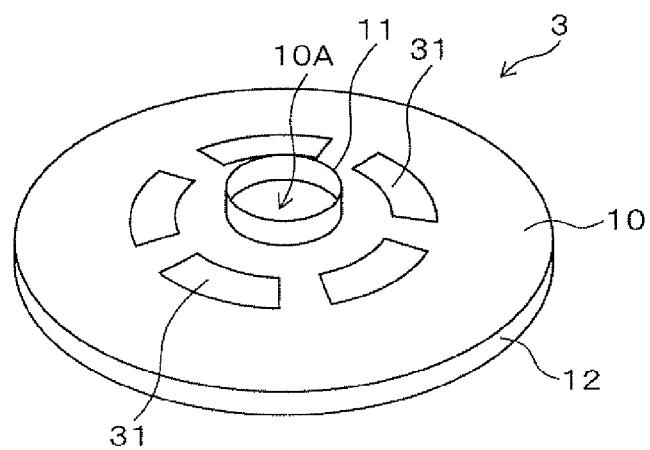
FIG. 5 is a perspective view showing another example of spring of one embodiment according to the present invention.

For example, in the above embodiment, the main body portion 10, the first cylindrical portion 11, and the second cylindrical portion 12 have no structure formed thereon, but various structures may be formed thereon. For example, a slit may be formed on at least one of the main body portion 10, the first cylindrical portion 11, and the second cylindrical portion 12. Specifically, in a spring 2 shown in FIG. 4, slits 21 and 22 are formed on side surface portions of the first cylindrical portion 11 and the second cylindrical portion 12. In a spring 3 shown in FIG. 5, slits 31 are formed on the main body portion 10. The formation of the slits 21, 22, and 31 can be appropriately combined, and shapes thereof can be appropriately set. In these features, the weight of the spring can be reduced.

Figure 6:
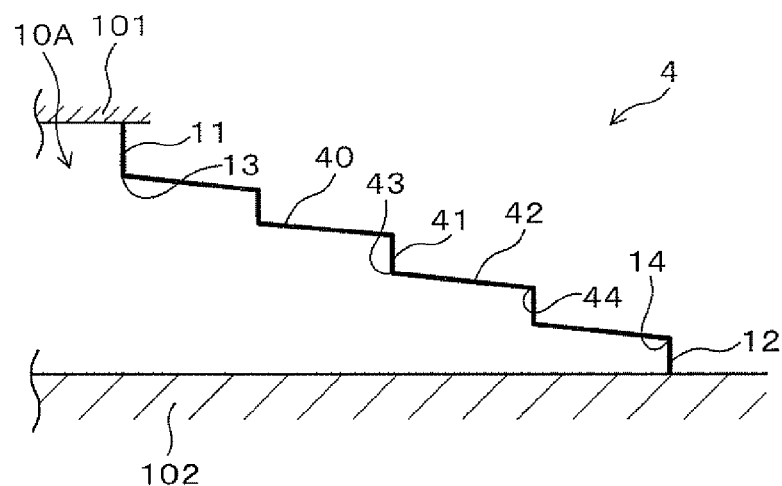
FIG. 6 is a side cross sectional view showing another example of spring of one embodiment according to the present invention.

For example, in the above embodiment, the main body portion 10 is the conical portion inclining in a lower direction from the inner periphery portion to the outer periphery portion, but the main body portion of the present invention is not limited thereto, and the main body portion can use various shapes. For example, in a spring 4 shown in FIG. 6, a main body portion 40 has a stepped shape from the inner periphery portion to the outer periphery portion. The stepped shape of the main body portion 40 has step portions having longitudinal direction portions 41 and lateral direction portions 42. Corner portions 43 are formed at boundary portions between the longitudinal direction portions 41 and the lateral direction portions 42. Corner portions 44 are formed at boundary portions between the step portions which are next to each other. The corner portions 43 and 44 can have the same function as the corner portions 13 and 14 of the above embodiment.

Figure 7:
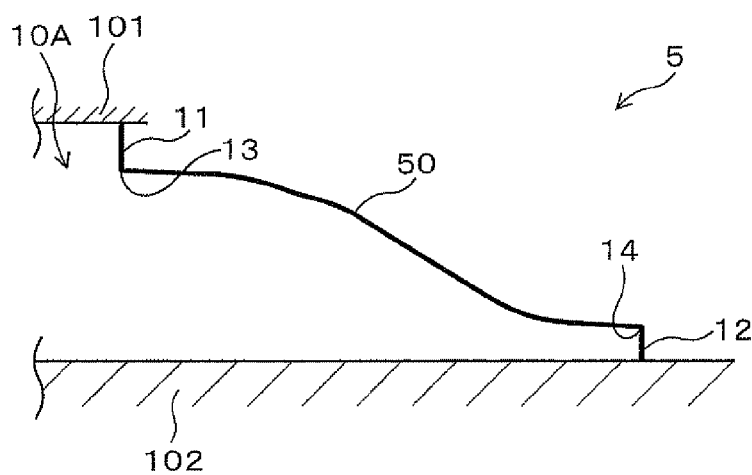
FIG. 7 is a side cross sectional view showing another example of spring of one embodiment according to the present invention.
Figure 8:
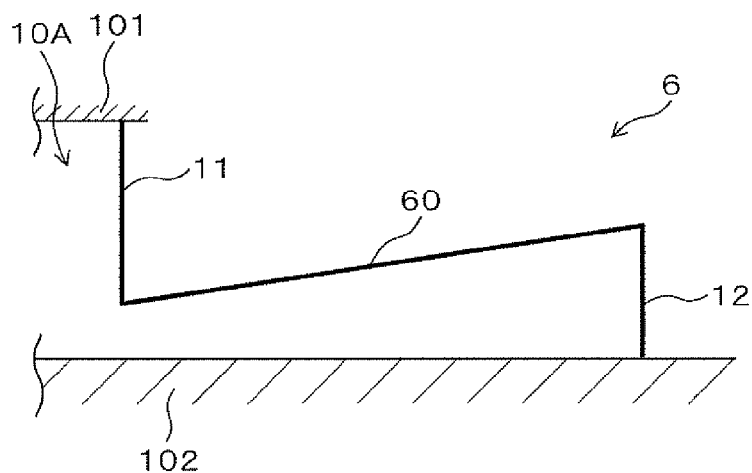
FIG. 8 is a side cross sectional view showing another example of spring of one embodiment according to the present invention.

In a spring 5 shown in FIG. 7, a main body portion 50 has an approximate S-shape. In a spring 6 shown in FIG. 8, a main body portion 60 has an approximate conical portion inclining from the inner periphery portion to the outer periphery portion in an upper direction. In this case, the first cylindrical portion 11 and the second cylindrical portion 12 are high. The main body portion 10 may have a plain shape which is approximately perpendicular to the first cylindrical portion 11 and the second cylindrical portion 12.

In the above embodiment, the first cylindrical portion 11 and the second cylindrical portion 12 are used as the projection of the present invention, but the projection of the present invention is not limited thereto, and the projection of the present invention can use various structures. For example, when deflection of the spring is set small, only one of the first cylindrical portion 11 and the second cylindrical portion 12 can be used. The shape of the projection is not limited to the cylindrical shape of the above embodiment, and the projection can use various shapes (for example, approximate conical shape). In this case, the shape of cross section of the projection is not limited to a linear shape, and it may be a curved shape (for example, approximate S-shape).

Figure 9:
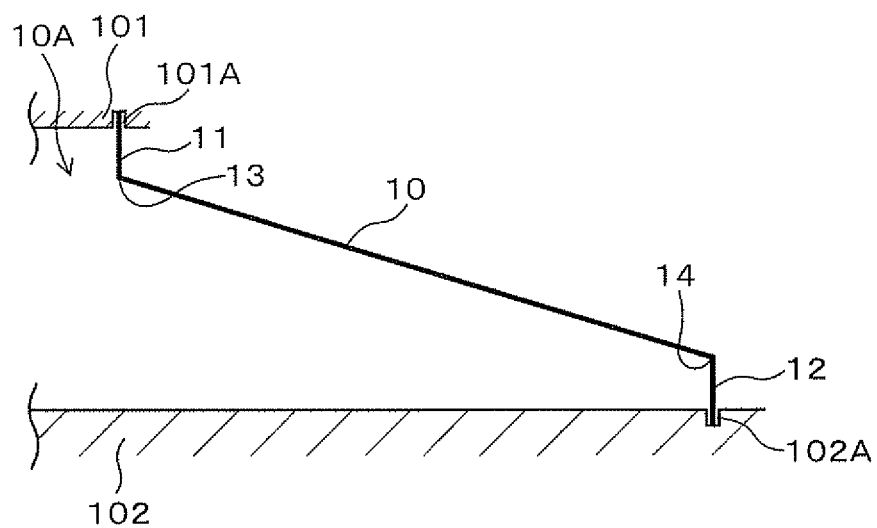
FIG. 9 is a side cross sectional view showing another example of spring of one embodiment according to the present invention.
Figure 10:
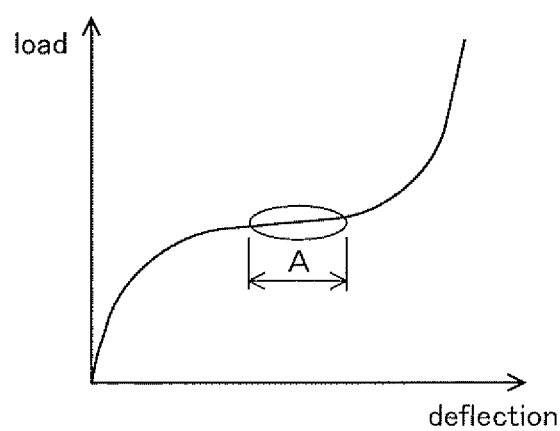
FIG. 10 is a graph showing load characteristics of coned disc spring.
Figure 11A:
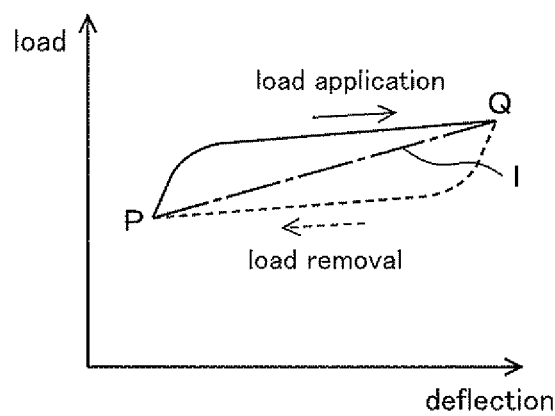
FIGS. 11A and 11B are graphs showing practical load characteristics of coned disc spring in which hysteresis generates.
Figure 11B:
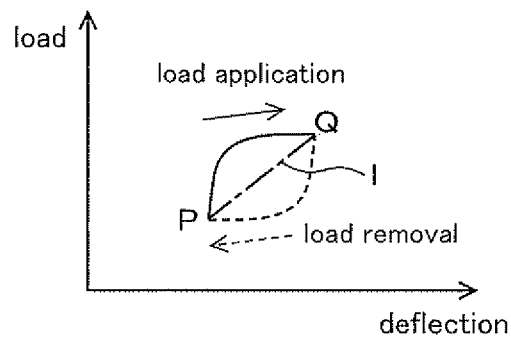

A stopper can be formed on the first member 101 and the second member 102 on which the first cylindrical portion 11 and the second cylindrical portion abut. As shown in FIG. 9, recesses 101A and 102A, with which the first cylindrical portion 11 and the second cylindrical portion 12 engage, can be formed on as a stopper on the first member 101 and the second member 102. A stopper is not limited to the recesses 101A and 102A, and it may be a fixing device for fixing the first cylindrical portion 11 and the second cylindrical portion 12. A stopper can be modified in various manners. In these features, generation of hysteresis in the load characteristics of the spring 1 can be effectively prevented.

In the above embodiment, the first cylindrical portion 11 and the second cylindrical portion 12 project toward the first member 101 and the second member 102 and they abut thereon. Alternatively, the first cylindrical portion 11 may project toward the second member 102 and it may abut thereon, and the second cylindrical portion 12 may project toward the first member 101 and it may abut thereon. In the above embodiment, the first cylindrical portion 11 and the second cylindrical portion 12 are formed at the inner periphery portion and the outer periphery portion of the main body portion 10. Alternatively, one of the first cylindrical portion 11 and the second cylindrical portion 12 may be formed. The shapes of the first corner portion 13 and the second corner portion 14 are not limited to those shown in Figures, and they can be modified to various shapes such as cured surfaces.

The modification examples of the formation of the structures such as the slits, the shapes of the main body portion and the projection, the formation of the stopper, the formed position and the projecting direction of the projection, and the shapes of the first corner portion and the second corner portion can be appropriately combined.

The invention claimed is:

1. A spring, which is provided between a first member and a second member, comprising:
    a main body portion having a hole;
    a cylindrical projection provided at at least one periphery portion of an inner periphery portion and an outer periphery portion of the main body portion; and
    a corner portion formed at a boundary portion between the main body portion and the cylindrical projection, wherein
    the main body portion extends in a direction which crosses a direction of pressing force provided by pressing one of the first member or the second member toward the other of the first member or the second member,
    the cylindrical projection has an abutting portion which projects from the periphery portion of the main body portion to one member of the first member and the second member and abuts thereon, and
    the corner portion is a portion which is formed such that the boundary portion between the main body portion and the cylindrical projection is folded,
    when the pressing force is provided, the corner portion is elastically deformed such that an angle of the corner portion is smaller, the angle being at a side of the member on which the abutting portion abuts, and
    the diameter of the cylindrical projection does not change when the pressing force is provided, whereby hysteresis is not generated in load characteristics of the spring.

2. A spring according to claim 1, wherein the abutting portion does not slide on the member on which the abutting portion abuts even when the pressing force changes.

3. A spring according to claim 1, wherein the main body portion has an inclined shape, a stepped shape, or an approximate S-shape from the inner periphery portion to the outer periphery portion of the main body portion.

4. A spring according to claim 1, wherein a slit is formed at at least one of the main body portion and the cylindrical projection.

5. A spring according to claim 1, wherein a stopper for preventing a slide of the abutting portion on the member, on which the cylindrical projection abuts, is provided on the member.

* * * * *